(12) United States Patent
Adelson (10) Patent No.: US 7,793,887 B2
(45) Date of Patent: Sep. 14, 2010

(54) INTEROPERABLE AERIAL REFUELING METHODS

(75) Inventor: Richard L. Adelson, Andover, KS (US)

(73) Assignee: The Boeing Company, Chicago, IL (US)

( * ) Notice: Subject to any disclaimer, the term of this patent is extended or adjusted under 35 U.S.C. 154(b) by 210 days.

(21) Appl. No.: 12/198,781

(22) Filed: Aug. 26, 2008

(65) Prior Publication Data
US 2009/0039201 A1 Feb. 12, 2009

Related U.S. Application Data

(62) Division of application No. 11/554,967, filed on Oct. 31, 2006, now Pat. No. 7,431,241, which is a division of application No. 10/992,153, filed on Nov. 18, 2004, now Pat. No. 7,147,186.

(51) Int. Cl.
*B64D 39/00* (2006.01)

(52) U.S. Cl. .................................. 244/135 A

(58) Field of Classification Search ............... 244/1 TD, 244/135 A; 141/231
See application file for complete search history.

(56) References Cited

U.S. PATENT DOCUMENTS

| | | | |
|---|---|---|---|
| 2,663,523 A | 12/1953 | Leisy |
| 2,941,761 A | 6/1960 | Cox et al. |
| 3,061,246 A | 10/1962 | Kirby |
| 3,976,100 A | 8/1976 | Souslin |
| 4,072,283 A | 2/1978 | Weiland |
| 4,398,685 A | 8/1983 | Task et al. |
| 4,411,399 A | 10/1983 | Hapke |
| 4,438,793 A | 3/1984 | Brown |
| 4,519,560 A | 5/1985 | Ishimitsu et al. |
| 4,540,144 A | 9/1985 | Perrella |
| 4,586,683 A | 5/1986 | Kerker |
| H297 H | 7/1987 | Schultz |
| 5,131,438 A | 7/1992 | Loucks |
| 5,141,178 A | 8/1992 | Alden et al. |

(Continued)

FOREIGN PATENT DOCUMENTS

DE  10013751 A1  10/2001

(Continued)

OTHER PUBLICATIONS

"Discussion Paper on Interoperability as Supported by the Defense Standardization Program", Departmental Standardization Office, Jul. 27, 2002. Retrieved from the Internet: <www.dsp.dla.mil/interop/interop.pdf>.

(Continued)

*Primary Examiner*—Rob Swiatek
(74) *Attorney, Agent, or Firm*—Lee & Hayes, PLLC (57) ABSTRACT

An Interoperable aerial refueling method enables tanker aircraft configured with a boom and receiver refueling system to refuel an aircraft configured for the probe and drogue refueling system. In one embodiment, a receptacle, coupled to a refueling drogue, is configured to fluidly receive a terminal portion of a refueling boom is. A retainer is coupled to an aircraft that removably retains the receptacle when the aircraft is refueling another aircraft configured to directly engage the boom. The receptacle releases the receptacle when the terminal portion of the boom engages the receptacle so that an aircraft that receives the refueling drogue may be refueled.

8 Claims, 6 Drawing Sheets

U.S. PATENT DOCUMENTS

| | | | |
|---|---|---|---|
| 5,148,989 | A | 9/1992 | Skinner |
| 5,393,015 | A | 2/1995 | Piasecki |
| 5,573,206 | A | 11/1996 | Ward |
| 5,667,170 | A | 9/1997 | Moss et al. |
| 5,785,276 | A | 7/1998 | Ruzicka |
| 5,906,336 | A | 5/1999 | Eckstein |
| 5,996,939 | A | 12/1999 | Higgs et al. |
| 6,819,982 | B2 | 11/2004 | Doane |
| 6,832,743 | B2 | 12/2004 | Morin et al. |
| 7,188,807 | B2 * | 3/2007 | Smith ................ 244/135 A |
| 2006/0000950 | A1 | 1/2006 | Von Thal et al. |

FOREIGN PATENT DOCUMENTS

FR   2705082 A1   11/1994

OTHER PUBLICATIONS

"KC-767 Common Widebody Tanker & Transport", Global Security. org. Apr. 10, 2006. Retrieved from the Internet: <www.globalsecurity.org/military/systems/aircraft/kc-767.thm>.

"KC-135 Aerial Refueling System Improvements", 5.5 Interoperable Boom Aerial Refueling System Concept, M/BP1/90-354/1.1142, pp. 142-144, 1990.

"Joint Petroleum Logistics Planning Guide", Petroleum and Water Department US Army Quartermaster Center and School, Jun. 2003.

"Report to the Congressional Defense Committees", KC-767A Air Refueling Aircraft Multi-Year Lease Pilot Program, Jul. 19, 2003, pp. 1-8.

Sullivan, "Air Force Assessment of the Joint Strike Fighter's Aerial Refueling Method", Mar. 14, 2005, pp. 1-8.

"Aerial refueling", Wikipedia, The Free Encyclopedia, Mar. 26, 2006, Retrieved from the Internet: http://en.wikipedia.org/w/index.php?title=Aerial_refueling&oldid=45617205> on Apr. 13, 2006.

"Boeing KC-767", Wikipedia, The Free Encyclopedi, Apr. 6, 2006, Retrieved from the Internet: <http://en.wikipedia.org/w/index.php?title=Boeing_KC-767&oldid=47231460> on Apr. 13, 2006.

* cited by examiner

FIG. 9

INTEROPERABLE AERIAL REFUELING METHODS

CROSS-REFERENCE TO RELATED APPLICATIONS

This patent application is a divisional application of and claims priority to commonly-owned Ser. No. 11/554,967, filed Oct. 31, 2006, now U.S. Pat. No. 7,431,241, issued on Oct. 7, 2008, which is a divisional application claiming priority to Ser. No. 10/992,153, filed Nov. 18, 2004, now U.S. Pat. No. 7,147,186 entitled "Interoperable Aerial Refueling Apparatus and Methods" issued on Dec. 12, 2006.

TECHNICAL FIELD

The present disclosure relates generally to aerial refueling of aircraft, and in particular to interoperable aerial refueling methods.

BACKGROUND

Aerial refueling, or "in-flight" refueling, has long been used to increase the endurance of an aircraft. In general terms, a fuel supply carried within a supply aircraft, commonly known as a "tanker," is transferred to a receiving aircraft that typically follows the tanker and engages a fuel transfer device that is deployed from the tanker. Following the engagement, fuel is transferred from the tanker to the receiving aircraft through the fuel transfer device. Following the transfer of a desired amount of fuel, the receiving aircraft disengages the fuel transfer device and departs.

In one commonly used aerial refueling system, known as the "probe and drogue" system, a retractable hose is deployed from the tanker that includes a drogue or "basket" coupled to a trailing end of the hose. The drogue further includes a valve positioned on an inner portion of the drogue that interrupts a flow of fuel to the receiving aircraft when the aircraft disengages the drogue. The receiving aircraft includes a probe that extends forwardly from the receiving aircraft that is configured to engage the valve positioned within the drogue, so that the receiving aircraft may receive fuel from the tanker.

In another commonly used aerial refueling system, known as the "boom and receiver" system, the fuel transfer device comprises a boom that is coupled to a rear portion of the tanker. The boom includes an elongated, rigid and hollow shaft operable to transfer the fuel, and a telescoping extension portion positioned at an end of the boom. The telescoping extension portion includes a valve configured to be received by a corresponding fuel receiver on the receiving aircraft. The boom also includes a ruddervator assembly generally comprised of airfoils that permit the tanker to controllably maneuver the boom relative to the receiving aircraft. Accordingly, during an aerial refueling operation, the tanker will release the boom from a stowed position and extend the telescoping portion of the boom. The boom may then be directed towards the receiving aircraft by controlling the aerodynamic surfaces to guide the end of the boom into the fuel receptacle on the receiving aircraft. While the boom and the receiver portion are coupled, the telescoping extension portion permits fuel to be continuously transferred by accommodating small relative motions occurring between the tanker and the receiving aircraft.

Figure 1:
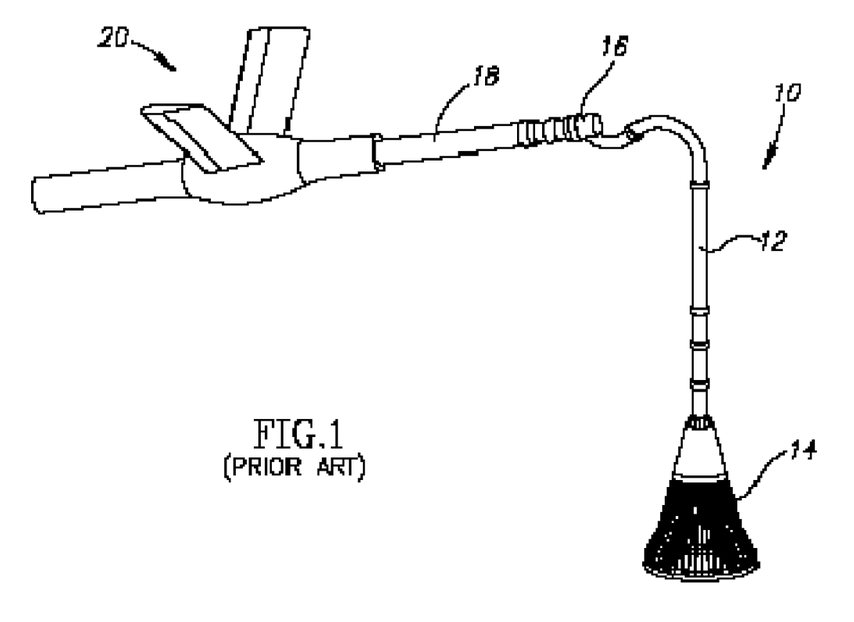
FIG. 1 is an isometric view of an aerial refueling adapter according to the prior art.

Although the foregoing aerial refueling systems achieve desirable results, certain drawbacks exist. In particular, an incompatibility exists between tanker aircraft that are configured with the boom and receiver system and a receiving aircraft configured for the probe and drogue system. In order to permit refueling operations between tankers having a refueling boom and probe-equipped receiver aircraft, a refueling adapter, as shown in FIG. 1 may be employed. The refueling adapter 10 includes a hose 12 having a drogue 14 positioned at one end, and a boom-mating portion 16 positioned on an opposing end. The boom-mating portion 16 is configured to be removably coupled to the telescoping extension portion 18 of the boom 20, so that fuel within the tanker (not shown in FIG. 1) may be transferred to the drogue 14. During an aerial refueling operation employing the refueling adapter 10, the boom 20 is released from the stowed position, and controllably maneuvered towards the receiving aircraft (also not shown in FIG. 1). Although FIG. 1 shows the refueling adapter 10 in a non-flight condition, with the hose 12 and the drogue 14 depending downwardly from the boom 20, it is nevertheless understood that while the tanker is in flight, the hose 12 and the drogue 14 extend generally outwardly and behind the boom 20 due to aerodynamic drag. When the boom 20 having the refueling adapter 10 is properly positioned, the probe of the receiving aircraft engages the drogue and receives fuel.

One drawback associated with the foregoing refueling adapter 10 is that it must be installed on the boom 20 prior to flight, and cannot be removed while the tanker is in flight. Consequently, once the boom 20 is configured with the refueling adapter 10, the tanker cannot refuel an aircraft configured for the boom and receptacle equipped receiver system.

What is needed in the art is an improved aerial refueling system that is interoperable, so that a tanker configured for the boom and receptacle system may also be configured to refuel aircraft configured with the probe and drogue system without employing a ground-mounted adaptor.

SUMMARY

The present disclosure comprises interoperable aerial refueling methods. In one aspect, a method includes providing fuel to a first receiving aircraft configured to receive fuel by directly coupling to a terminal end of a refueling boom coupled to a tanker aircraft. The method further includes, while the tanker aircraft is in flight, configuring the boom of the tanker aircraft to supply fuel to a second receiving aircraft having a refueling probe operable to receive fuel from a refueling drogue.

In another aspect, a method includes providing fuel to a first receiving aircraft having a refueling probe operable to receive fuel from a refueling drogue by engaging a receptacle of the hose and drogue assembly with a terminal end of a refueling boom coupled to a tanker aircraft. The method further includes, while the tanker aircraft is in flight, configuring the tanker aircraft to supply fuel to a second receiving aircraft configured to receive fuel by directly coupling to the terminal end of the refueling boom by disengaging the receptacle of the hose and drogue assembly from the terminal end of the refueling boom.

BRIEF DESCRIPTION OF THE DRAWINGS

Embodiments of the present disclosure are described in detail below with reference to the following drawings.

DETAILED DESCRIPTION

The present disclosure relates to aerial refueling of aircraft, and in particular to an interoperable aerial refueling method. Many specific details of certain embodiments of the disclosure are set forth in the following description and in FIGS. 2 through 9 to provide a thorough understanding of such embodiments. One skilled in the art, however, will understand that the present disclosure may have additional embodiments, or that the present disclosure may be practiced without several of the details described in the following description.

Figure 2:
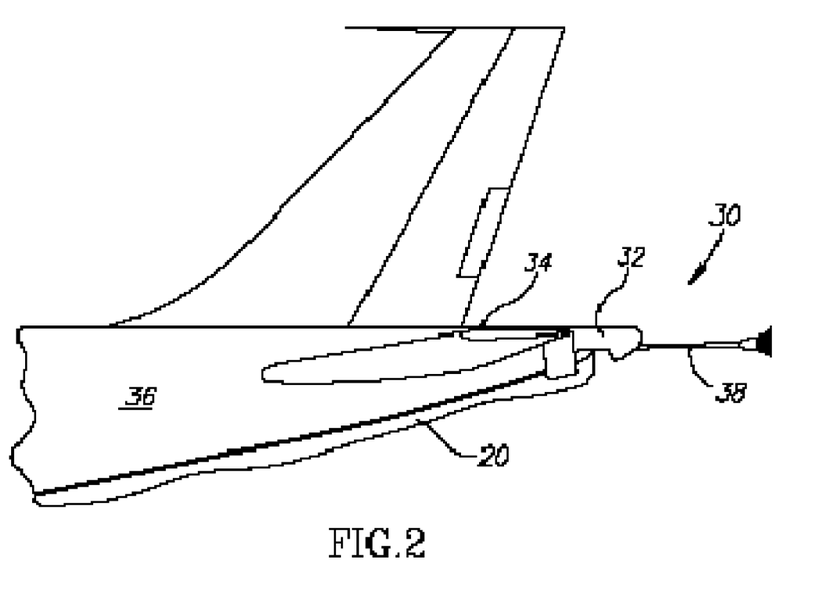
FIG. 2 is a partial side view of an aircraft that includes an interoperable aerial refueling apparatus used to refuel an aircraft according to an embodiment of the disclosure.

FIG. 2 is a partial side view of an aircraft that includes an interoperable aerial refueling apparatus 30 that is used to refuel an aircraft according to an embodiment of the disclosure. The refueling apparatus 30 includes a fairing 32 that is fixedly coupled to a rear portion 34 of the aircraft 36. The fairing 32 demountably retains a hose and drogue assembly 38 while the aircraft 36 is in flight, while permitting a refueling boom 20 to be operated without interference, so that a receiving aircraft may be refueled using the boom and receiver system. Although the refueling boom 20 is shown in a stowed position, it is understood that the boom 20 is angled downwardly and away from the rear portion 34 of the aircraft 36 when a refueling operation is conducted. When it is desired to refuel an aircraft using the probe and drogue system, the refueling boom 20 engagably receives the hose and drogue assembly 38 and demounts the assembly 38 from the fairing 32. The boom 20 may be lowered downwardly and away from the rear portion 34 with the hose and drogue assembly 38 attached. Accordingly, aircraft configured for the probe and drogue assembly may then be refueled.

Figure 3:
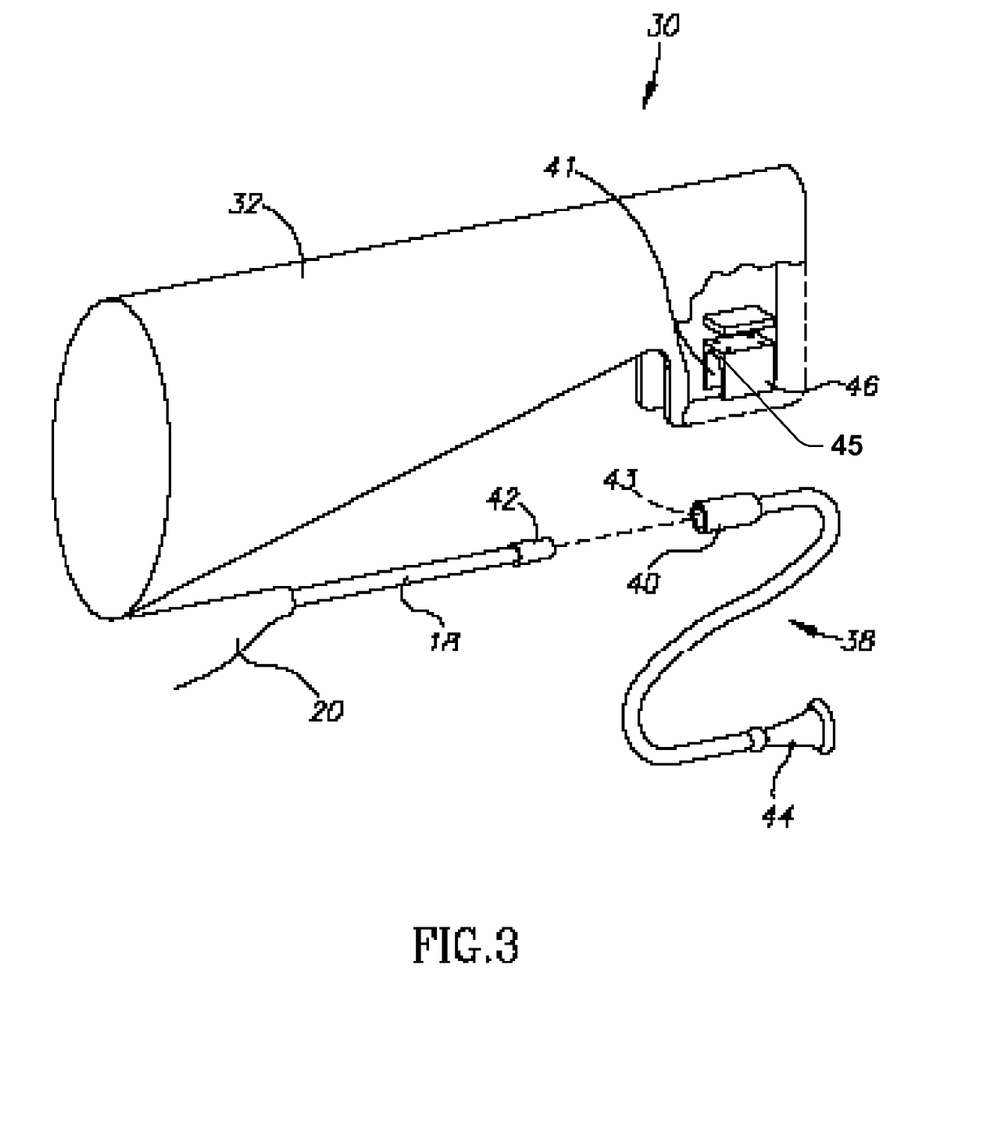
FIG. 3 is an exploded and partial cutaway view of the interoperable aerial refueling apparatus of FIG. 2.

FIG. 3 is an exploded and partial cutaway view of the interoperable aerial refueling apparatus 30 of FIG. 2 that will be used to describe the refueling apparatus 30 in greater detail. The hose and drogue assembly 38 includes a receptacle 40 that is configured to receive a valve portion 42 (boom refueling nozzle) of the telescoping extension portion 18 so that the receptacle 40 is sealably retained by the valve portion 42. For clarity of illustration, the telescoping extension portion 18 is shown in a partially extended position. It is understood, however, that the telescoping extension portion 18 is typically fully retracted within the boom 20 while the boom 20 is in the stowed position, and correspondingly may be fully extended when the boom 20 is deployed. The receptacle 40 further includes an electrical contact 43 operable to verify that the receptacle 40 is sealably and lockably coupled to the valve portion 42. When the valve portion 42 is opened, fuel may be communicated from the boom 20 to a drogue 44 that is positioned on a terminal end of the assembly 38. Verification of the coupling between the valve portion 42 and the receptacle 40 may also be used to energize pumps located in an on-board fuel supply system within the aircraft 36.

With continued reference to FIG. 3, the refueling apparatus 30 further includes a retainer 46 disposed within the fairing 32 that is configured to receive the receptacle 40 within a recess 41 to retain the receptacle 40 when not engaged by the valve portion 42. Accordingly, the retainer 46 includes an internal structure 45 within the recess 41 to lockably retain the receptacle 40 within the retainer 46 so that the hose and drogue assembly 38 cannot detach from the aircraft 36 (as shown in FIG. 2) unless the receptacle 40 is properly positioned on the valve portion 42. Accordingly, the retainer 46 may also include an electrical switch positioned within the recess 41 that is operable to provide an indication to one or more flight crewmembers that the receptacle 40 is suitably locked within the recess 41.

With reference now to FIGS. 2 and 3, the refueling apparatus 30 may be provided as a refueling method for tanker aircraft that are configured with the boom and receiver system 20. The installation of the package thus enables tanker aircraft that are configured with the boom and receiver system 20 to be used to refuel aircraft configured for the probe and drogue system.

Figure 4:
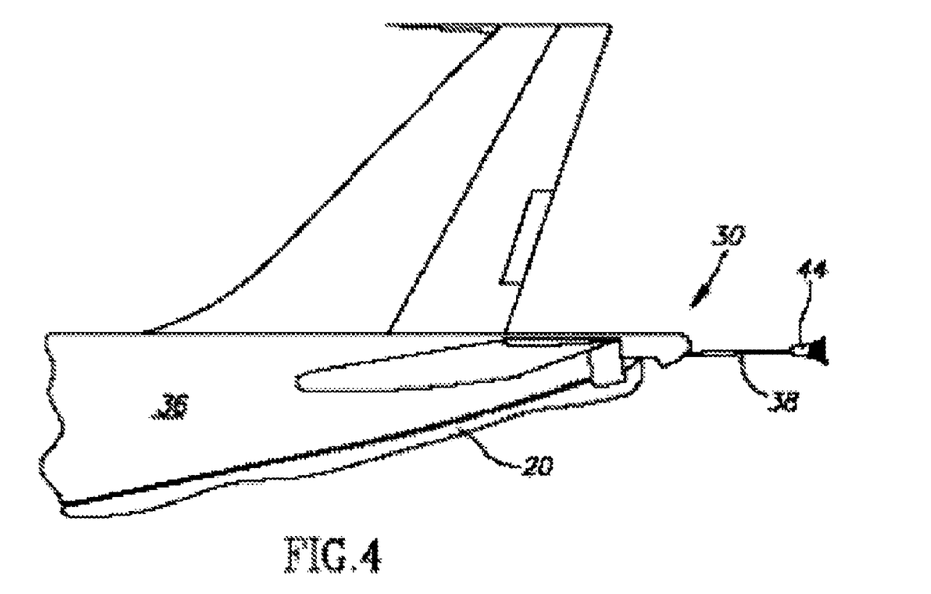
FIGS. 4 through 8 are partial side views of an aircraft that includes the interoperable aerial refueling apparatus of FIG. 2 that will be used to describe a method of refueling an aircraft.
Figure 5:
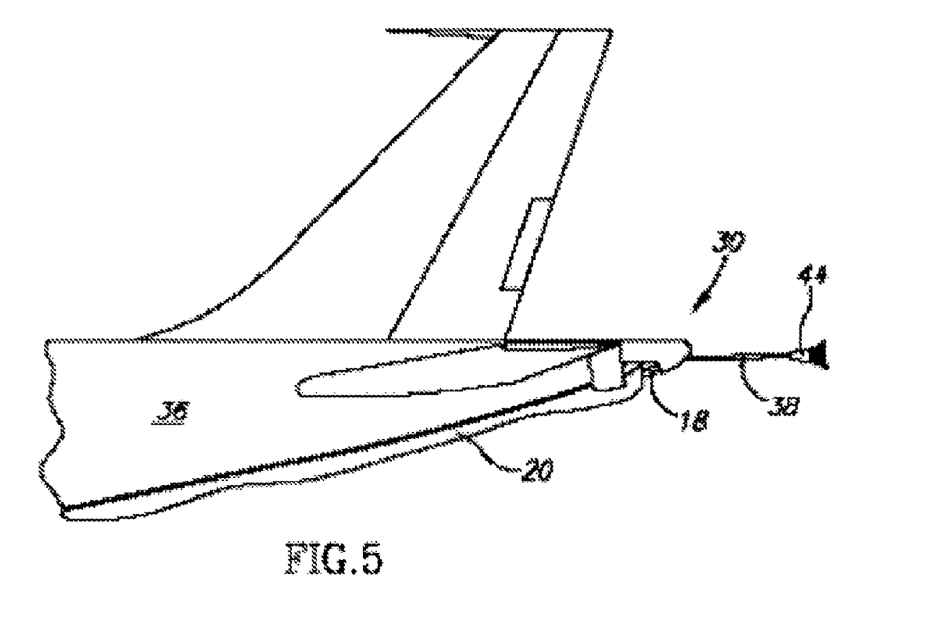

FIGS. 4 through 8 are partial side views of an aircraft that include the interoperable aerial refueling apparatus 30 of FIG. 2 that will be used to describe a method of aerial refueling. FIG. 4 shows the aircraft 36 in flight and prior to a refueling operation. Accordingly, the boom 20 is in the stowed position, and the hose and drogue assembly 38 is secured within the retainer 46 (as shown in FIG. 3). As shown in FIG. 5, when it is desired to refuel an aircraft configured with the probe and drogue system, the telescoping extension portion 18 of the boom 20 extends outwardly from the boom 20 to engage the valve portion 42 of the extension portion 18 (as shown in FIG. 3) with the receptacle 40 of the assembly 38. When the valve portion 42 and the receptacle 40 are suitably engaged, the receptacle 40 is released from the recess 41 in the retainer 46 (as shown in FIG. 3). In addition, the extension portion 18 may retract slightly to remove the receptacle 40 from the retainer 46. The boom 20 may then be moved downwardly from the aircraft 36 to a lowered position to refuel a receiving aircraft, and the fuel pumps turned on to permit fuel to be communicated to the drogue 44.

Figure 6:
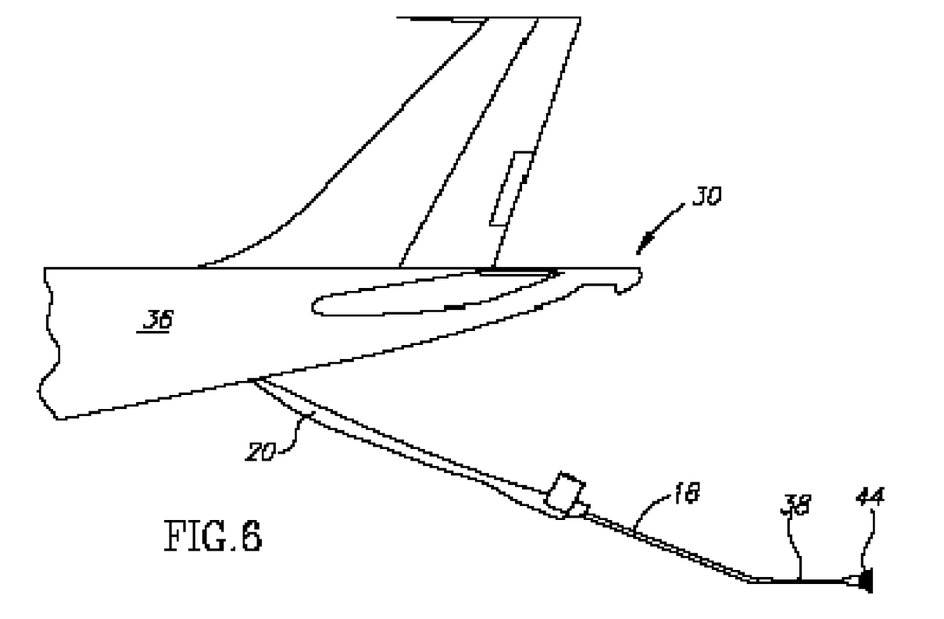
Figure 7:
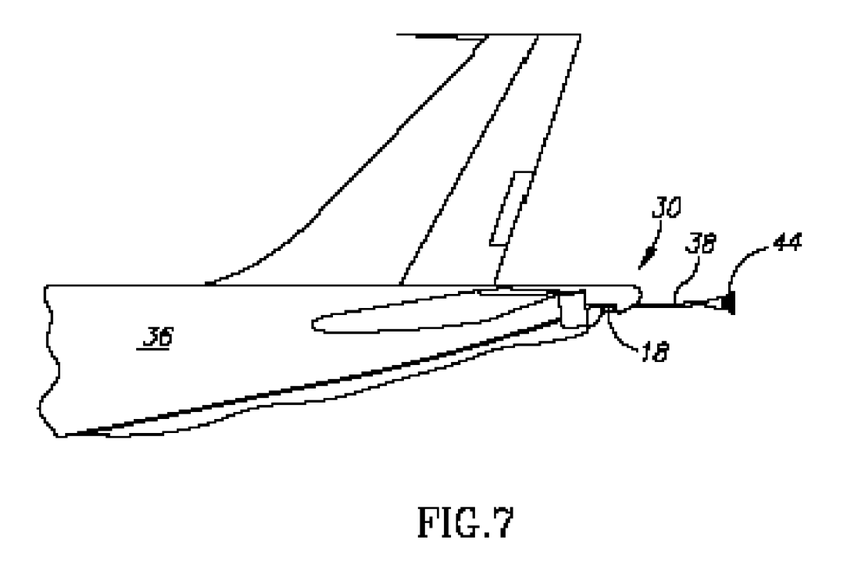

FIG. 6 shows the refueling boom 20 in the lowered position with the hose and drogue assembly 38 attached to the extension portion 18, which is shown in a fully extended position. The aircraft 36 is now ready to refuel a receiving aircraft that uses the probe and drogue system. Accordingly, the probe of the receiving aircraft is maneuvered into contact with a valve positioned within the drogue 44, and fuel is dispensed. At the completion of the refueling operation, the receiving aircraft disengages the probe from the drogue 44, and departs. The telescoping extension portion 18 of the refueling boom 20 may then be retracted, and the boom 20 moved upwardly towards the stowed position, as shown in FIG. 7. When the boom 20 is fully in the stowed position, the extension portion 18 moves the receptacle 40 of the hose and drogue assembly 38 into the recess 41 of the retainer 46 (as shown in FIG. 3) and the receptacle 40 is locked into the recess 41. When the receptacle 40 is properly locked, an indication is provided through the electrical contact 43 located within the recess 41, and the valve portion 42 is disengaged from the receptacle 40.

Figure 8:
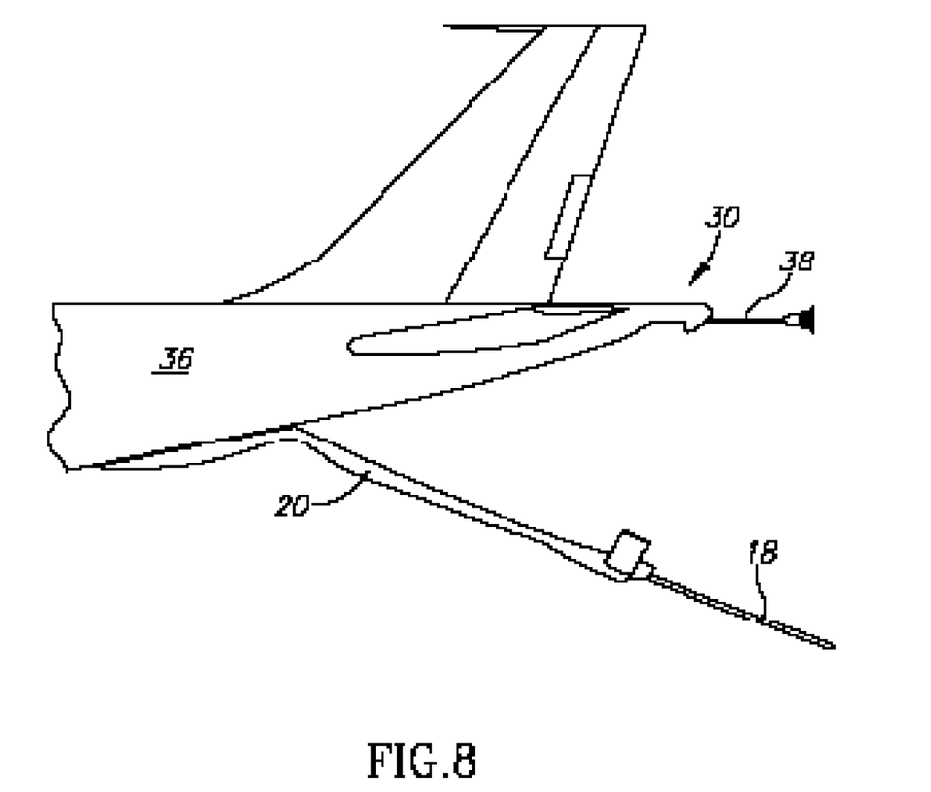

FIG. 8 shows the refueling boom 20 again in the lowered position, and with the telescoping extension portion 18 fully extended from the boom 20, so that the aircraft 36 may refuel a receiving aircraft configured for the boom and receiver system. During the refueling operation, the hose and drogue assembly 38 is securely locked within the fairing 32 by the retainer 46 (as shown in FIG. 3) so that the assembly 38 will not interfere with the refueling operation.

It will be appreciated that a variety of alternate embodiments of the disclosure may be conceived, and that the disclosure is not limited to the particular embodiments described above and shown in FIGS. 2-8. For example, in alternate embodiments, alternate ways of connecting the end of the refueling boom 20 to the hose and drogue assembly 38 may be conceived. More specifically, in alternate embodiments, the end of the boom 20 need not be inserted into the receptacle 40 of the hose and drogue assembly 38, but rather, may encapsulate a tip portion of the hose and drogue assembly 38. In further embodiments, other ways of coupling the end of the boom 20 to the hose and drogue assembly 38 may be conceived.

Similarly, a variety of alternate ways of releasably coupling the hose and drogue assembly 38 to the fairing 32 or other portion of the interoperable aerial refueling apparatus 30, or to the aircraft 36, may be conceived. For example, the retainer 46 having the recess 41 may be replaced with any other suitable securing device, including but not limited to a mechanical retaining clip, an electromechanical retaining device, or an electromagnetic retaining device. Such other suitable securing devices need not engage with the receptacle 40, but rather, may securely engage with any other suitable portion of the hose and drogue assembly 38, including, for example, the hose portion of the assembly 38.

Figure 9:
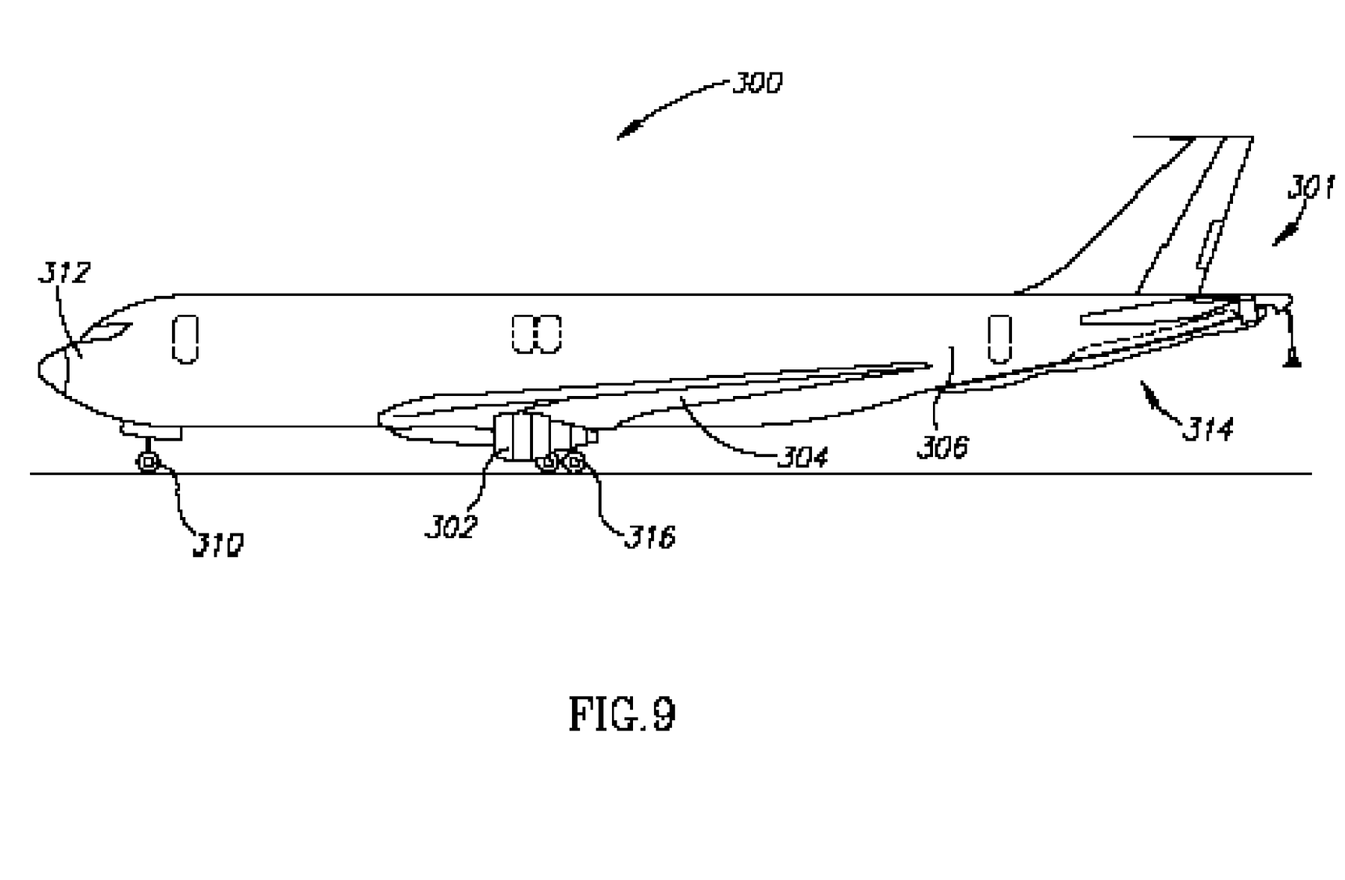
FIG. 9 is a side elevation view of an aircraft having one or more of the disclosed embodiments of the present disclosure.

Those skilled in the art will also readily recognize that the foregoing embodiments may be incorporated into a wide variety of different systems. Referring now in particular to FIG. 9, a side elevation view of an aircraft 300 having one or more of the disclosed embodiments of the present disclosure is shown. With the exception of the embodiments according to the present disclosure, the aircraft 300 includes components and subsystems generally known in the pertinent art, and in the interest of brevity, will not be described in detail. As shown in FIG. 9, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 301 and a landing assembly 310 coupled to the fuselage 306. The aircraft 300 further includes other systems and subsystems generally required for the proper operation of the aircraft 300. For example, the aircraft 300 includes a flight control system 312 (not shown in FIG. 9), as well as a plurality of other electrical, mechanical and electromechanical systems that cooperatively perform a variety of tasks necessary for the operation of the aircraft 300. Accordingly, the aircraft 300 is generally representative of a tanker aircraft, which may include, for example, the KC-10 and KC-135 aircraft produced by The Boeing Company of Chicago, Ill. Although the aircraft 300 shown in FIG. 9 generally shows a tanker aircraft, it is understood that the various embodiments of the present disclosure may also be incorporated into flight vehicles of other types. Examples of such flight vehicles may include rotary wing aircraft, as illustrated more fully in various descriptive volumes, such as Jane's All The World's Aircraft, available from Jane's Information Group, Ltd. of Coulsdon, Surrey, UK.

With reference still to FIG. 9, the aircraft 300 may include one or more of the embodiments of the interoperable aerial refueling method 314 according to the present disclosure, which may operate in association with the various systems and sub-systems of the aircraft 300, as previously described.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A method of in-flight refueling of aircraft, comprising:
providing fuel to a first receiving aircraft by coupling the first receiving aircraft to a terminal end of a refueling boom coupled to a tanker aircraft;
engaging a receptacle of a hose and drogue assembly with a valve positioned on the terminal end of the refueling boom; and
while the tanker aircraft is in flight, configuring the refueling boom of the tanker aircraft to supply fuel to a second receiving aircraft having a refueling probe operable to receive fuel from a refueling drogue.

2. The method of claim 1, wherein the engaging the receptacle of the hose and drogue assembly with the valve positioned on the terminal end of the refueling boom further comprises removing the receptacle from a retainer coupled to the tanker aircraft.

3. The method of claim 1, wherein the engaging the receptacle of the hose and drogue assembly with the valve positioned on the terminal end of the refueling boom further comprises coupling an electrical contact positioned on the receptacle to a corresponding electrical contact positioned on the terminal end of the refueling boom.

4. A method of in-flight refueling of aircraft, comprising:
providing fuel, via a hose and drogue assembly, to a first receiving aircraft by:
fluidly engaging a receptacle of the hose and drogue assembly with a valve positioned on a terminal end of a refueling boom coupled to a tanker aircraft; and
coupling the first receiving aircraft to the drogue of the hose and drogue assembly; and
while the tanker aircraft is in flight, fluidly disengaging the receptacle of the hose and drogue assembly from the terminal end of the refueling boom such that the tanker aircraft may supply fuel to a second receiving aircraft via the refueling boom.

5. The method of claim 4, wherein the engaging the receptacle of the hose and drogue assembly with the valve positioned on the terminal end of the refueling boom further comprises removing the receptacle from a retainer coupled to the tanker aircraft.

6. The method of claim 4, wherein the engaging the receptacle of the hose and drogue assembly with the valve positioned on the terminal end of the refueling boom further comprises coupling an electrical contact positioned on the receptacle to a corresponding electrical contact positioned on the terminal end of the refueling boom.

7. A method of in-flight refueling of aircraft, comprising:
providing fuel to a receiving aircraft by:
removing a receptacle of a hose and drogue assembly from a retainer coupled to a tanker aircraft, the retainer lockably retaining the receptacle of the hose and drogue assembly; and
fluidly engaging the receptacle of the hose and drogue assembly with a valve positioned on a terminal end of a refueling boom coupled to the tanker aircraft; and
while the tanker aircraft still is in flight:
fluidly disengaging the receptacle of the hose and drogue assembly from the terminal end of the refueling boom; and
returning the receptacle of the hose and drogue assembly to the retainer coupled to the tanker aircraft.

8. The method of claim 7, wherein the fluidly engaging the receptacle of the hose and drogue assembly with the valve positioned on the terminal end of the refueling boom further comprises coupling an electrical contact positioned on the receptacle to a corresponding electrical contact positioned on the terminal end of the refueling boom.

* * * * *